D. D. SHIERK.
PISTON PACKING RING.
APPLICATION FILED MAY 1, 1916.
1,195,279.
Patented Aug. 22, 1916.
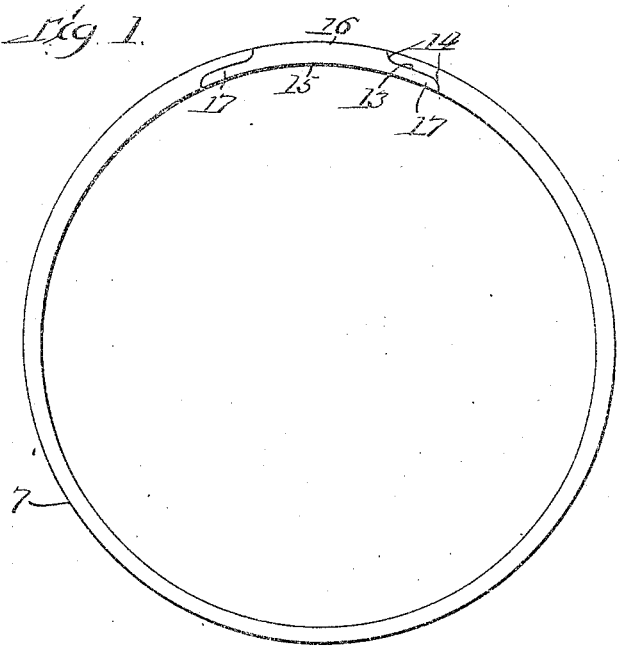
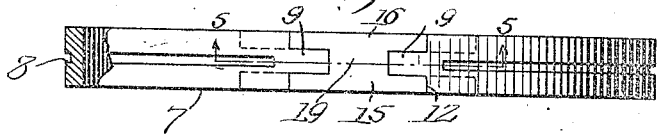
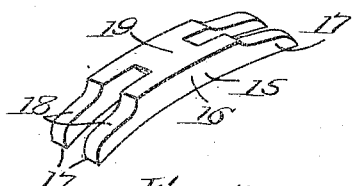
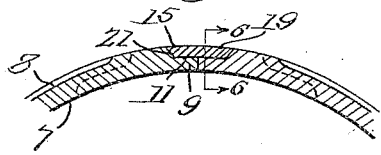
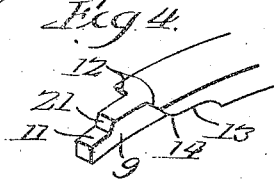
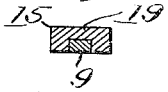
Inventor:
Darell D. Shierk
By Pond & Wilson

UNITED STATES PATENT OFFICE.

DEARELL D. SHIERK, OF ROCKFORD, ILLINOIS.

PISTON PACKING-RING.

1,195,279.

Specification of Letters Patent.    Patented Aug. 22, 1916.

Application filed May 1, 1916.   Serial No. 94,688.

*To all whom it may concern:*

Be it known that I, DEARELL D. SHIERK, a citizen of the United States, residing at Rockford, in the county of Winnebago and State of Illinois, have invented certain new and useful Improvements in Piston Packing-Rings, of which the following is a specification.

This invention relates to piston packing rings of the split type employed in connection with engines for the purpose of preventing leakage of gases under high pressure past the pistons and for insuring the full compression in the cylinders necessary in internal combustion engines.

In piston rings of the split type it is customary to provide a joint or filler member coöperatively associated with the ends of the ring to insure a tight joint. Although various designs of joint members have been provided they have been found objectionable for reasons such as being impractical from a manufacturing standpoint, not insuring leak-proof joints, and particularly because many of the joints, due to relative radial movement of the ends of the ring or to slight movements or other displacement of the joint member as the ring expands from wear, cause scratching and grooving of the cylinder walls.

The primary object of my invention is to provide a leak-proof piston ring of the split type which will not mar or groove the cylinder walls under any condition of usage. To this end I have employed a relatively wide split eccentric ring of greater thickness in the region of its end portions than at the bend of the ring, so as to insure against any twisting or warping of the end portion and have provided a joint member of novel construction by which a tight joint is maintained at all times and which also further prevents any such relative movement of the parts as might cause the edges thereof to groove the cylinder wall.

Other objects of my invention are to provide a split piston ring and joint constructed so as to be capable of production at a comparatively low cost and which will effectively serve the purposes for which it is designed throughout a maximum period of usage and under the heaviest of strains to which it is subjected.

These objects and other attendant advantages will be manifest as the invention becomes better understood by reference to the following description when considered in connection with the accompanying drawings, in which—

Figure 1 is a side view of a piston packing ring embodying my improvements; Fig. 2 is an edge view of the ring, a portion being shown in section; Figs. 3 and 4 are perspective views of the joint member and an end of the ring, respectively; and Figs. 5 and 6 are sectional views taken on the lines 5—5 of Fig. 2 and 6—6 of Fig. 5, respectively.

The ring designated generally by reference character 7, is preferably constructed in the form shown, that is a relatively wide ring of eccentric construction with the thickest portion at the joint. The peripheral face of the ring is divided by a circumferential groove 8 that terminates short of the ends of the ring, as shown in Figs. 2 and 5. This groove conveys sufficient oil to promote a better seal and lubrication, and the relatively wide ring structure insures rigidity so as to prevent warping or springing of the ends of the ring which would cause leakage and would scratch or groove the cylinder wall. By employing thicker stock in the ends of the ring there is less tendency for these ends to spring out of position when subjected to heavy strains.

The ends of the ring, that is, those portions adjacent to the joint, are of similar construction and shaped in a novel manner to coöperate with a joint member described hereinafter. The formation of an end of the ring is best shown in Fig. 4, from which it will be seen that the ring is cut away evenly at both sides forming a central reduced end or tongue 9, a portion of the peripheral surface of which adjacent to the end of the tongue is cut away as at 11, for a purpose described hereinafter. The end of the ring is also undercut longitudinally on both sides of the tongue commencing from the neck 12 thereof. These undercuts leave the underside of the tongue extending longitudinally beyond the neck 12 away from the end of the ring and provide underfaces 13 at both sides of the tongue that are formed on an arc concentric with the outer periphery of the ring. Since these undercuts are preferably made with a milling cutter the end 14 of the cuts are rounded so as to avoid sharp corners and prevent collection of carbon in the joint.

The joint member designated generally by reference character 15 is best shown in Fig. 3. It consists of a pair of spaced side portions shaped to fill in between the inner and outer peripheries of the ring, the space defined by the sides and under cutaways of the ends of the ring when the ends are in abutting relation, that is, when the ring is closed. These side portions have central portions 16 of a thickness equal to the thickness of the ring at this point and end portions 17, the upper faces 18 of which conform to and are slidably associated with the underfaces 13 of the ring. The side portions of the joint member are connected by a cross portion 19 fitting in the space allowed by the peripheral cutaways on the ends of the tongues 9. It will be noted that the ends 21 of the said peripheral cutaways converge inwardly so as to provide surfaces which prevent accumulation of carbon, since the same will tend to work outwardly on inclined faces of this character.

From the foregoing, it will be obvious that the ends of the ring engage beneath a peripheral cross portion of the joint member and the ends of the side portions of the joint member engage beneath underfaces of the ends of the ring. These associated faces, being on arcs concentric with the periphery of the ring and having opposed faces located centrally and at the ends of the joint member, maintain the ends of the ring against relative radial movement, and also prevent any such movement of the joint member relatively to the ends of the ring and hold the parts in this relation regardless of the expansion of the ring due to wear. Thus is prevented any displacement or projecting of the ends or corners of the ring or joint beyond the periphery of the ring, such as might scratch or groove the cylinder walls. This construction also insures a leak-proof joint, and in this connection attention is particularly directed to the provision by the joint member of a peripheral portion extending across the full width of the ring opposite the joint of the abutting end thereof and of the central tongue and groove joints and the double-end tongue and groove joints. This arrangement because of the various opposed and offset faces effectively precludes leakage past the joint and at the same time serves other advantages already mentioned and is of such uniformity in design as to be capable of being manufactured at a comparatively low cost. It will also be noted that the design gives a rigid and substantial joint member having a relatively large area of joint face arranged most effectively for accomplishing the ends desired.

While I have shown for purpose of illustration but one embodiment of my improvements, it should be understood that the construction is capable of considerable modification, without departing from the spirit or scope of the invention as expressed in the appended claims.

I claim:

1. A piston ring comprising a split ring, the end portions of which are undercut at both sides of the ring concentric with the outer periphery of the ring and shaped to provide longitudinally projecting ends disposed centrally between said undercut side portions and cut away on their peripheral faces, and a joint member having spaced sides joined by a cross portion located in the peripheral cutaways of the ends of the rings, the opposite ends of said sides fitting into said undercut sides and conforming to the curved walls thereof so that the joint member is maintained through its coöperative engagement with the ends of the ring against radial displacement with respect thereto as the said ends are moved relatively upon expansion of the ring.

2. A piston ring comprising a split ring, the ends of which are shaped to provide centrally disposed longitudinal tongues and are undercut from the neck of the tongues away therefrom at both sides of the ring, the ends of the tongues being cut away on their peripheral faces, and a joint member fitting over the said peripheral cutaways of the ends of the tongues and having sides shaped to fit against the sides of the tongues and extend beneath the said undercut portions at the sides of the ring.

3. A piston ring comprising a split ring, the ends of which are centrally reduced in width and cut away on their peripheral faces, and are longitudinally undercut on both sides of the ring from said reduced ends, and a joint member having spaced sides fitting beneath said undercut side portions and against the sides of said reduced ends, said sides being centrally joined by a cross portion fitting in said peripheral cut away of the ends.

4. A piston ring, comprising a split ring having centrally reduced ends cut away on their peripheral faces, the ends of the ring being undercut on both sides from said reduced ends, and a joint member extending across the outer side of said peripheral cut aways of the ends of the ring and having spaced sides, the opposite ends of which extend beneath the undercut walls of the ring, whereby the joint member is held against radial displacement with respect to the ring by its central and end engagement with opposed faces of the ring.

5. As an article of manufacture, a joint member for piston rings comprising an arcuate body portion adapted to conform to the curvature of the ring, a cross portion located centrally thereof, extensions of greater thickness than said cross-section on opposite sides thereof, and having substantially the same thickness as the ring, and adapted to form a peripheral continuation of said ring when in assembled relation, and end portions carried by said extensions and having their outer peripheral faces cut away.

DEARELL D. SHIERK.